(12) United States Patent
Beatty et al.

(10) Patent No.: X2915
(45) Date of Patent: Feb. 25, 1818

(54) THRASHING MACHINE

(76) Inventors: Thomas Beatty; Micheal Shanks

Thomas Beatty & Michael Shanks, Citizens of the United States
Letters Patent

Dated 25th February 1818.

Memorandum of the Schedule referred to in these Letters Patent, and making part of the same, containing a description in the words of the said Thomas Beatty and Michael Shanks themselves of their improvement in the Thrashing Machine.

---

This machine consists of the outward frame and case; the outward case or cylinders or rubbers with protuberant or diamond points; the rack be where the straw and grain fall; and the riddle and fan for cleaning the grain.

To construct a machine for a two horse power, the frame will be about 11 feet high, 12 feet long, and 4 feet wide. The inner cylinder will be about 3 feet and a half in diameter, covered with cast iron staves with protuberant or diamond points or teeth for rubbing out the grain. The outward cylinder or case will be made to surround the former and be set about three fourths of an inch distant from it; and will also be covered in like manner with said cast iron staves with projecting points. The distance of these cylinders from each other, may be varied according to the size of the grain intended to be thrashed. The outward or concave cylinder will have two suitable openings, one at the top to admit the grain to be thrashed; and the other at the side for discharging it when thrashed. The fan is placed at the end of the machine for receiving the grain when thrashed, and has a wire screen for its bottom.

Operation of the Machine.

The machine is fed at the top or side by a person standing in an opening made for the purpose. The inner cylinder is turned by any convenient power for which purpose there will be suitable gearing; which cylinder rubbing the grain against the outer or concave one completely disengages it from the straw and hull. By the motion of the inner cylinder the grain and straw are carried round till they are discharged at the opening in the side of the case for that purpose. The grain and straw then falling on the rack, the straw passes off and the grain falls through, where it is conducted by a hopper on to the riddle; - it then passes down through the blast of the fan where it is completely cleaned.

This machine is calculated to thrash or rub out all kinds of small grain, and for shelling rice, &c.

When used for getting out clover seeds or rubbing wheat the cylinder may be made a conical taper, and will be placed at any convenient distance from each other by screws at the sides.

In front of the machine where [ obliterated . . . . . ] may be a wire screen which will admit the [ . . . . do. . . . . ] by the wind, but prevents the grain.

Witnesses
Wm Elliot
Benjamin Fenwick

Thomas Beatty
Michael Shanks

Received & Recorded

& Examined, W.T.

(500 words)